(12) United States Patent
Wu et al.

(10) Patent No.: US 11,517,818 B2
(45) Date of Patent: Dec. 6, 2022

(54) PROCESSING METHOD, RENDERING METHOD AND DEVICE FOR STATIC COMPONENT IN GAME SCENE

(71) Applicant: NETEASE (HANGZHOU) NETWORK CO., LTD., Zhejiang (CN)

(72) Inventors: Dongdong Wu, Zhejiang (CN); Jinwu Huang, Zhejiang (CN); Zhirong Du, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 103 days.

(21) Appl. No.: 16/965,607

(22) PCT Filed: Jan. 8, 2019

(86) PCT No.: PCT/CN2019/070865
§ 371 (c)(1),
(2) Date: Dec. 16, 2020

(87) PCT Pub. No.: WO2019/153997
PCT Pub. Date: Aug. 15, 2019

(65) Prior Publication Data
US 2021/0106913 A1    Apr. 15, 2021

(30) Foreign Application Priority Data
Feb. 9, 2018  (CN) .......................... 201810136749.7

(51) Int. Cl.
A63F 13/52    (2014.01)
A63F 13/60    (2014.01)
A63F 13/35    (2014.01)

(52) U.S. Cl.
CPC .............. *A63F 13/52* (2014.09); *A63F 13/35* (2014.09); *A63F 13/60* (2014.09)

(58) Field of Classification Search
None
See application file for complete search history.

(56) References Cited

U.S. PATENT DOCUMENTS

| | | | | |
|---|---|---|---|---|
| 2005/0228634 A1* | 10/2005 | Brumitt | ................... | G06F 16/00 703/22 |
| 2010/0190556 A1* | 7/2010 | Chan | ..................... | A63F 13/577 463/43 |

(Continued)

FOREIGN PATENT DOCUMENTS

| | | |
|---|---|---|
| CN | 102508662 A | 6/2012 |
| CN | 103544727 A | 1/2014 |

(Continued)

*Primary Examiner* — Damon J Pierce
(74) *Attorney, Agent, or Firm* — Gang Yu

(57) ABSTRACT

A processing method, rendering method and device for static components in a game scene are provided. The rendering method includes: a parent model corresponding to a plurality of static components is loaded, the parent model comprising at least two sub-models corresponding to at least two sub-components, and information of each of the at least two sub-models is recorded in a model file of the parent model; a scene global identifier of the at least one sub-model marked as hidden in the parent model is determined, wherein the scene global identifier includes identification information of each of the at least two sub-models in the game scene; and at least one sub-model not marked as hidden of the parent model is rendered in a preset manner.

20 Claims, 4 Drawing Sheets

(56) References Cited

U.S. PATENT DOCUMENTS

2016/0240000 A1 8/2016 Fishwick
2016/0379405 A1* 12/2016 Baca .................. G06T 7/536
　　　　　　　　　　　　　　　　　　　463/32

FOREIGN PATENT DOCUMENTS

| CN | 103871094 A | 6/2014 |
| CN | 104157007 A | 11/2014 |
| CN | 104636518 A | 5/2015 |
| CN | 105183571 A | 12/2015 |
| CN | 108339270 A | 7/2018 |
| JP | 2001204957 A | 7/2001 |

* cited by examiner

PROCESSING METHOD, RENDERING METHOD AND DEVICE FOR STATIC COMPONENT IN GAME SCENE

The present disclosure claims priority of Chinese Patent Application No. 201810136749.7, filed on Feb. 9, 2018 and named after "Processing Method, Rendering Method and Device for Static Component in Game Scene". Contents of the present disclosure are hereby incorporated by reference in its entirety of the Chinese Patent Application.

TECHNICAL FIELD

The present disclosure relates to the technical field of electronic games, and in particularly to a processing method, a rendering method and a device for static components in a game scene.

BACKGROUND

At present, for a game type that combines a shoot type game with a build type game, in order to realize the game play in which a player controls a virtual object to destroy or disassemble a static component in a game scene, most static components (such as houses, bridges, or bunkers) need to be detachable, reflecting the display effect that the most static components are gradually worn out due to physical attacks from the virtual objects until they disappear completely. The related method is to subdivide the static component into multiple sub-components in a game development process, and sub-models corresponding to the multiple sub-components are respectively created. The sub-model corresponding to the sub-component disassembled by the virtual object in a game running process will be deleted directly to achieve the game effect of the static component being disassembled.

It should be noted that the information disclosed in above is only for enhancement of understanding of the background of the disclosure, and thus may include information that does not constitute the related art known to at least one ordinary skill in the art.

SUMMARY

At least one embodiment of the present disclosure provides a processing method, a rendering method and a device for static components in a game scene.

According to an aspect of the present disclosure, a processing method for static components in a game scene is provided. The method may include:

sub-models corresponding to sub-components of the at least one static component are acquired;

the sub-models are combined to obtain a parent model corresponding to the at least one static component, and a first local identifier of each of the sub-models is generated, the first local identifier including identification information of each of the sub-models within the range of the parent model;

Information of each of the sub-models is recorded in a model file of the parent model, the information of each of the sub-models comprising the first local identifier; and the game scene is edited by using the parent model, and a first global identifier of the parent model is generated, the first global identifier including identification information of the parent model in the game scene, the first global identifier and the first local identifier are used for acquiring a scene global identifier of each of the sub-models, and the scene global identifier including the identification information of each of the sub-models in the game scene.

According to another aspect of the present disclosure, a rendering method for static components in a game scene is also provided. The game scene may include a plurality of static components, each of the static components comprising at least two sub-components, The method may include:

a parent model corresponding to the plurality of the static components is loaded, the parent mode comprising at least two sub-models corresponding to the at least two sub-components, and information of each of the at least two sub-models is recorded in a model file of the parent model;

the scene global identifier of at least one sub-model marked as hidden in the parent model is determined, the scene global identifier including identification information of each of the at least two sub-models in the game scene;

at least one sub-model not marked as hidden of the parent model is rendered in a preset manner.

According to another aspect of the present disclosure, a processing device for static components in a game scene is also provided, which may include at least one processor, and at least one memory for storing at least one program element, wherein the at least one program element may be executed by the at least one processor, the at least one program element may include:

an acquisition component, configured to acquire sub-models corresponding to sub-components of the at least one static component;

a first processing component, configured to combine the sub-models to acquire a parent model corresponding to the at least one static component, and generate a first local identifier of each of the sub-models, the first local identifier including identification information of each of the sub-models within the range of the parent model;

a recording component, configured to record information of each of the sub-models in a model file of the parent model, the information of each of the sub-models comprising the first local identifier; and a second processing component, configured to edit the game scene by using the parent model, and generate a first global identifier of the parent model, the first global identifier including identification information of the parent model in the game scene, the first global identifier and the first local identifier are used for acquiring a scene global identifier of each of the sub-models, and the scene global identifier including identification information of each of the sub-models in the game scene.

According to another aspect of the present disclosure, a rendering device for static components in a game scene is also provided. The game scene may include a plurality of static components, each of the static components comprising at least two sub-components. The device may include at least one processor, and at least one memory for storing at least one program element. The program element may be executed by the at least one processor. The at least one program element may include:

a loading component, configured to load a parent model corresponding to the plurality of the static components, the parent model comprising at least two sub-models corresponding to the at least two sub-components, and information of each of the at least two sub-models is recorded in a model file of the parent model;

a determination component, configured to determine a scene global identifier of at least one sub-model marked as hidden in the parent model, the scene global identifier including identification information of each of the at least two sub-models in the game scene; and a rendering component, configured to render at least one sub-model not marked as hidden, of the parent model in a preset manner.

According to another aspect of the present disclosure, an electronic device is also provided. The electronic device may include:

a processor; and a memory, connected with the processor and configured to store at least one executable instruction of the processor, Wherein the processor is arranged to execute the at least one executable instruction, and the at least one executable instruction includes:

the game scene may include a plurality of static components, each of the static components comprising at least two sub-components, a parent model corresponding to the plurality of the static components is loaded, the parent model comprising at least two sub-models corresponding to the at least two sub-components, and information of each of the at least two sub-models is recorded in a model file of the parent model;

a scene global identifier of at least one sub-model marked as hidden in the parent model is determined, the scene global identifier including identification information of each of the at least two sub-models in the game scene;

at least one sub-model not marked as hidden of the parent model is rendered in a preset manner.

According to another aspect of the present disclosure, a computer-readable storage medium is also provided. At least one computer program may be stored thereon. The at least one computer program may be executed by at least one processor to implement the above rendering method for static components in a game scene.

DETAILED DESCRIPTION OF THE EMBODIMENTS

Figure 1:
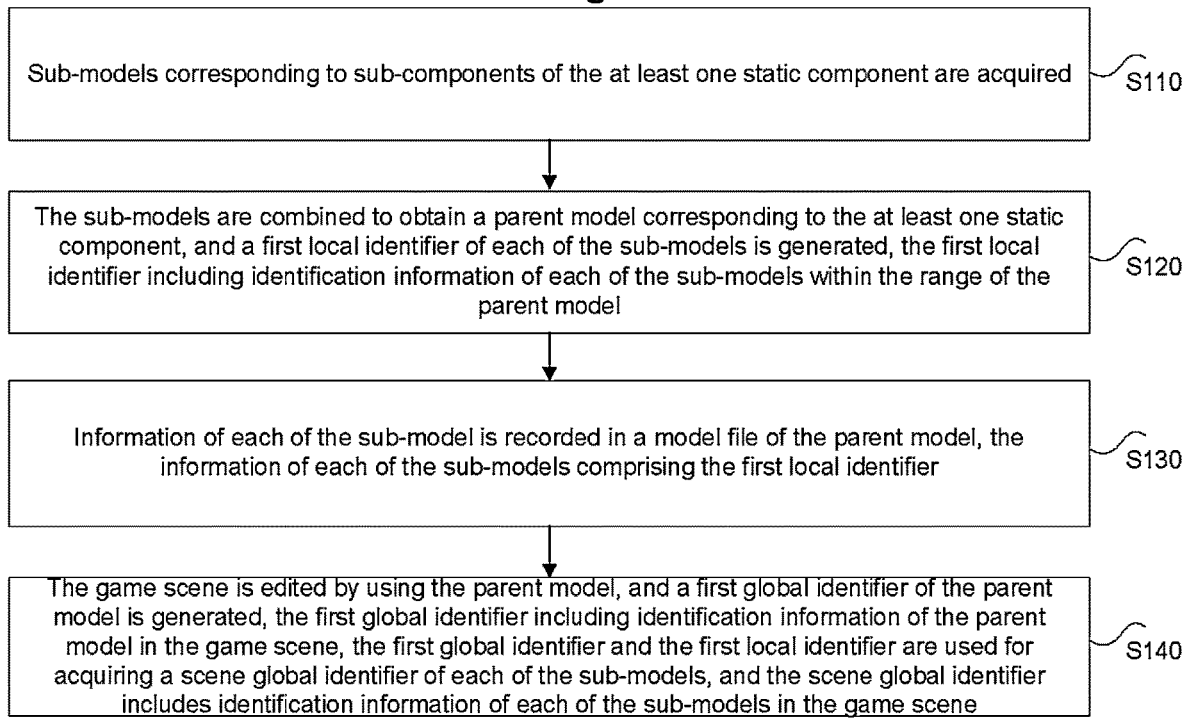
FIG. 1 is a flowchart of a processing method for static components in a game scene according to an embodiment of the present disclosure.

It should be noted that in the case of no conflict, the features in the embodiments and the embodiments in the present disclosure may be combined with each other. The present disclosure is described below with reference to the drawings and in conjunction with the embodiments in detail.

In order to make those skilled in the art better understand the solutions of the present disclosure, the technical solutions in the embodiments of the present disclosure will be clearly and completely described below with reference to the drawings in the embodiments of the present disclosure. It is apparent that the described embodiments are only a part of the embodiments of the present disclosure, not all of the embodiments. On the basis of the embodiments of the present disclosure, all other embodiments obtained on the premise of no creative work of at least one ordinary skill in the art should fall within the scope of protection of the present disclosure.

It should be noted that the specification and claims of the disclosure and the terms "first", "second" and the like in the drawings are used to distinguish similar objects, and do not need to describe a specific sequence or a precedence order. It will be appreciated that data used in such a way may be exchanged under appropriate conditions, in order that the embodiments of the disclosure described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

It also should be noted that various triggering events disclosed in the present embodiment may be preset, and different triggering events may trigger to execute different functions.

Due to a huge scene of this kind of game, there are many static components. If the static components are subdivided into sub-components, the number of corresponding sub-models is very large. All models occupy a lot of memory, and game terminals with small memory (especially mobile devices) are often difficult to bear. Even if the memory is enough, so many trivial subdivision models will put a lot of pressure on the terminal in data processing and graphics rendering.

In the following exemplary embodiments, the game scene includes at least one static component, which may be a monument built in a game scene, such as a house, a horizontal plane, a vertical plane, a slope, a table, a chair, a street lamp, or other virtual objects. The at least one static component may be presented by rendering of a graphical user interface of a game client. The presented content may include the static component globally or locally.

The game scene includes at least one virtual object and may be presented by rendering of the graphical user interface of the client. The presented content may include the virtual object globally or locally. For example, in a third person perspective game, the content presented by the graphical user interface may include the entire part of the virtual object. For another example, in a first person perspective game, the content presented by the graphical user interface may include part or portion of the virtual object.

The virtual object may be a virtual object of an enemy camp, or may be a virtual object of an own camp. The virtual object may perform corresponding actions in the game scene in response to an operation of a user. For example, the user may control the virtual object to walk, run, squat, bend, attack, shoot, etc. in the game scene, and may also control the virtual object to build and disassemble the static component in the game scene. The present disclosure is not limited herein.

The embodiment of the present disclosure provides a processing method for static components in a game scene. FIG. 1 is a flowchart of a processing method for static components in a game scene according to an embodiment of the present disclosure. As shown in FIG. 1, in the present embodiment, the method includes the following steps.

At step S110, sub-models corresponding to sub-components of the at least one static component are acquired.

At step S120, the sub-models are combined to acquire a parent model corresponding to the at least one static component, and a first local identifier of each of the sub-models is generated, the first local identifier including identification information of each of the sub-models within the range of the parent model.

At step S130, information of each of the sub-model is recorded in a model file of the parent model, the information of each of the sub-models comprising the first local identifier.

At step S140, the game scene is edited by using the parent model, and a first global identifier of the parent model is generated, the first global identifier including identification information of the parent model in the game scene, the first global identifier and the first local identifier are used for acquiring a scene global identifier of each of the sub-models, and the scene global identifier includes identification information of each of the sub-models in the game scene.

In the present embodiment, the sub-components of each of the at least one static component may be a portion of the each of the at least one static component. For example, the static component is a house in the game scene, and the sub-components are a vertical wall, a horizontal wall, a roof, etc. of the house. Multiple sub-models corresponding to multiple sub-components are acquired respectively. The sub-models are combined into one large model, that is, a parent model. Information such as a Vertex Buffer (VB), an Index Buffer (IB), UV, 2UV, or texture may be combined. Meanwhile, model information of each of the sub-models is recorded in a model file of the parent model. The model information may include first or more of a vertex subscript, a vertex number, an index subscript, an index number, and sub_destroy_id (i.e., a first local identifier) of the sub-models. The sub_destroy_id is generated when the sub-models are combined, and is used for uniquely identifying each of the sub-models within the range of the parent model. For example, it may be a number from 0 to 1024 (8 bits).

When the game scene is edited, the parent model is used for scene placement. When game scene is placed, a destroy_id (i.e., a first global identifier) is generated for the parent model. For example, a generation rule may be set to indicate a land parcel number by the first 16 bits. 8 bits in the first 16 bits represent the unique identifier of the parent model in the land parcel, and the last 8 bits are 0. Thus, addition with the sub_destroy_id does not cause mutual influence. The destroy_id of the parent model and the sub_destroy_id of the sub-model, a total of 32 bits, may generate a full_destroy_id (i.e., a scene global identifier) for accurately positioning the sub-models.

Figure 3:
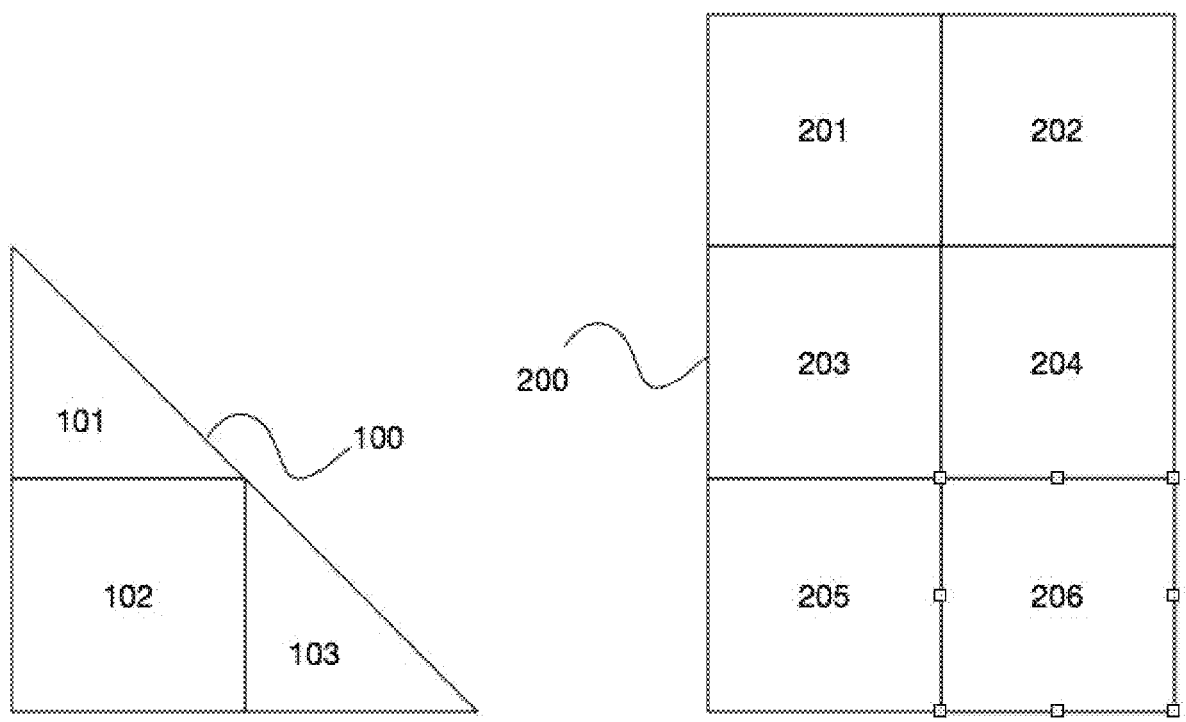
FIG. 3 is a schematic diagram of a static component in a game scene according to one of exemplary embodiments of the present disclosure.
Figure 4:
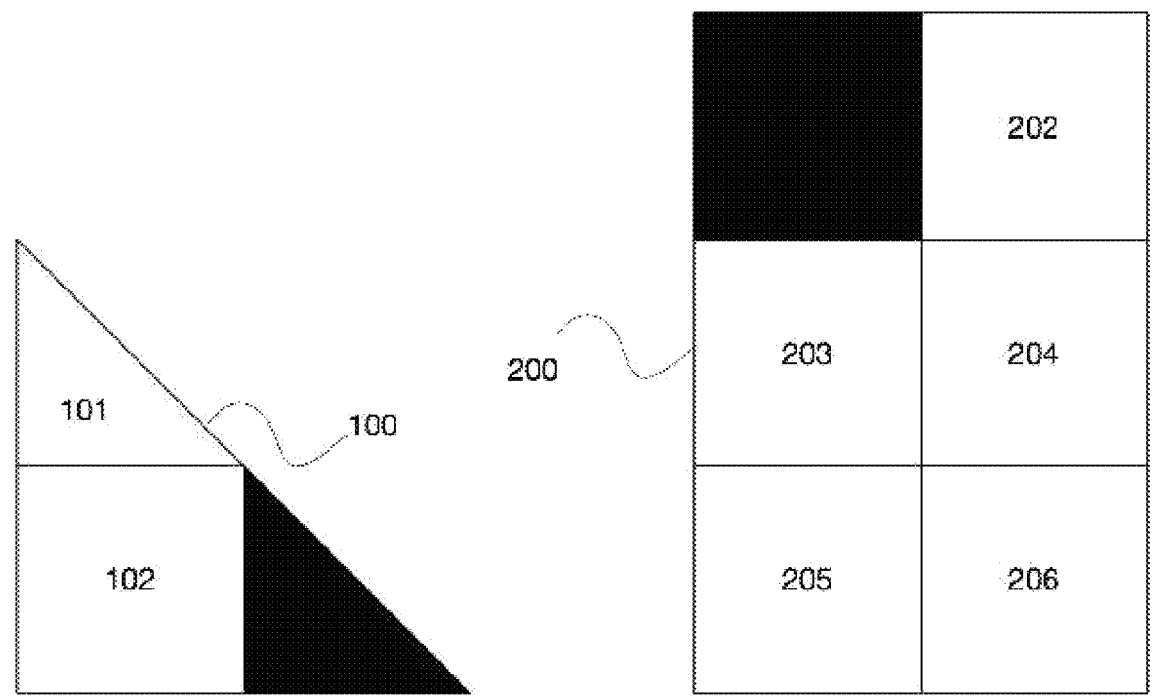
FIG. 4 is a schematic diagram of a partially removed static component in a game scene according to one of exemplary embodiments of the present disclosure.

When a target sub-component of the static component needs to be hidden to implement the disassembly effect, only a first local identifier of a target sub-model corresponding to the target sub-component and a first global identifier of the parent model corresponding to the static component are acquired, and then a scene global identifier of the target sub-model is acquired according to a preset rule, thereby locally hiding the disassembled target sub-component when rendering the static component. As shown in FIG. 3, in a game scene, a parent model 100 corresponding to a static component includes sub-models 101, 102, and 103. The parent model 200 corresponding to another static component includes sub-models 201, 202, 203, 204, 205, and 206. As shown in FIG. 4, a portion of the parent model 100 corresponding to the sub-model 103 in FIG. 3 is hidden, and a portion of the parent model 200 corresponding to the sub-model 201 in FIG. 3 is hidden.

Through the above implementation, sub-models of sub-components of at least one static component are respectively acquired, and then the sub-models are combined into a parent model (a large model composed of a small model group) corresponding to the at least one static component. Information of each of the sub-models is recorded in a model file of the parent model, including identification information (i.e., a first local identifier) of each of the sub-models within the range of the parent model. Since the information of each of the sub-models is retained in the model file of the parent model, the parent model can be locally hidden by using the information of the each of the sub-models in a game running process. Thus, the disassembly rendering effect of a static component can be achieved. According to another aspect, only one parent model needs to be rendered in the game running process by the static component produced according to the present implementation, and the pressure of memory and rendering brought by a large number of models is relieved effectively.

In an optional implementation, the method further includes the following steps.

An association relationship of at least one sub-collider corresponding to each of the sub-models is established.

The first local identifier of each of the sub-model corresponding to the at least one sub-collider is recorded.

The association relationship of the at least one sub-collider corresponding to each of the sub-models is established, and the first local identifier of each of the sub-models corresponding to each of the at least one sub-collider is recorded, so that the at least one sub-collider can be uniquely mapped to the corresponding sub-models of the parent model corresponding to the static component through the association relationship. Thus, in the game running process, when the virtual object performs physical attacks such as disassembly of the static component, the at least one sub-collider within the attack range can be determined by physical detection of a game engine, thereby determining a sub-model corresponding to the disassembled sub-component, and achieving the effect of locally disassembling the static component by the virtual object.

In an optional implementation, the method further includes the following steps.

Low-precision sub-models corresponding to the sub-components of preset number of static components are acquired, the low-precision sub-models being models of low-precision version of the sub-models.

The low-precision sub-models corresponding to the sub-components of the preset number of static components are combined to acquire a grandparent model corresponding to a static component set composed of the preset number of the static components, and a second local identifier of each of the low-precision sub-models is generated, the second local identifier including identification information of the low-precision sub-models within the range of the grandparent model.

Information of the low-precision sub-models is recorded in a model file of the grandparent model, the information of the low-precision sub-models including the second local identifier.

A second global identifier of the grandparent model is generated, the second global identifier including identification information of the grandparent model in the game scene, the second global identifier and the second local identifier are used for acquiring the scene global identifier of the low-precision sub-models in the game scene.

Game in over-sized scene generally uses a Level of Detail (LOD) mechanism. For example, models in the distance are low-precision models. In order to achieve local disassembly of LOD models (i.e., the low-precision model), the present embodiment also combines the LOD models. The preset number of the static component may be set according to the specific situation of the game. For example, 8*8 land parcel objects are combined into one large model (i.e., the grandparent model). Each land parcel is one of the sub-models (i.e., the parent model) of the grandparent model, and the objects in each land parcel are only part of the parent model (i.e., the sub-model). Information of the sub-models of the grandparent model is needed to be recorded to hide the removed part of the distant LOD model. Similarly, in the LOD mechanism, the scene global identifier of the low-precision sub-models are acquired by the second global identifier of the grandparent model and the second local identifier of each of the low-precision sub-models in the grandparent model.

In an optional implementation, the method further includes the following steps.

An association relationship of at least one sub-collider corresponding to each of the low-precision sub-models is established.

The second local identifier of each of the low-precision sub-models corresponding to the at least one sub-collider is recorded.

Similarly, in order to achieve local disassembly of the low-precision models, it is necessary to uniquely map all low-precision sub-models under the grandparent model to the corresponding sub-collider according to the association relationship. Thus, in the game running process, when the virtual object performs physical attacks such as disassembly of the static component, the at least one sub-collider within the attack range can be determined by physical detection of a game engine, thereby the low-precision sub-models corresponding to the disassembled sub-component are determined and the effect of locally disassembling the static component by the virtual object is achieved.

In an optional implementation, the method further includes at least one of the following steps.

The at least one sub-collider corresponding to each of the low-precision sub-models having a volume smaller than a preset volume is acquired.

The at least one sub-collider corresponding to each of the low-precision sub-model having a height lower than a preset height is acquired.

In order to avoid too many colliders under the grandparent model, it is possible to acquire the at least one sub-collider corresponding to each of the small-sized or low-height low-precision sub-models, for example, the at least one sub-collider of small-sized or low-height objects.

Figure 2:
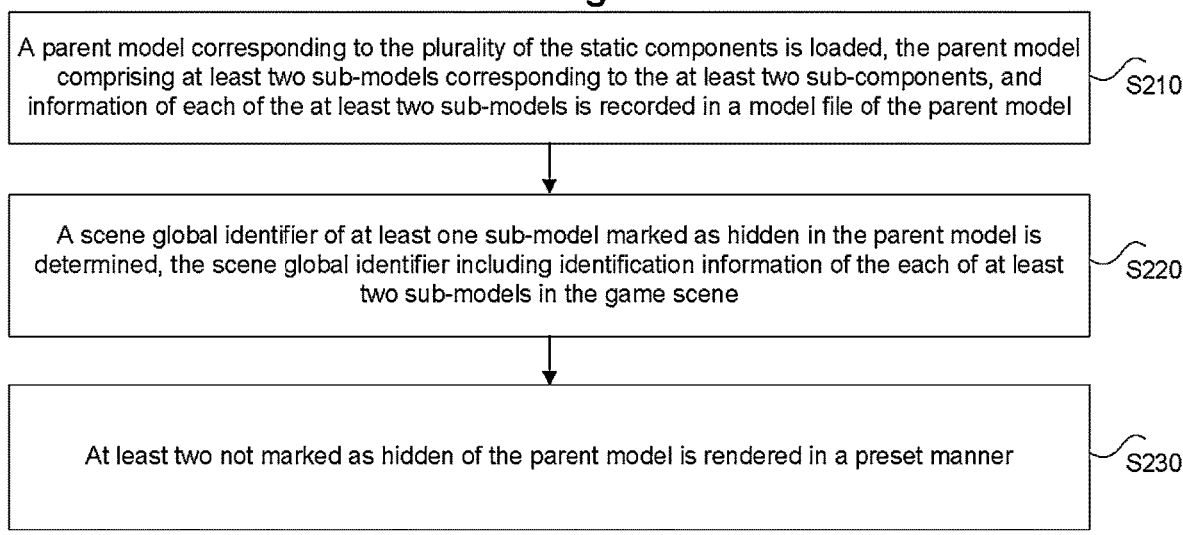
FIG. 2 is a flowchart of a rendering method for static components in a game scene according to an embodiment of the present disclosure.

The embodiment of the present disclosure also provides a rendering method for static components in a game scene. The game scene includes a plurality of static components, each of the static components comprising at least two sub-components. FIG. 2 is a flowchart of a rendering method for static components in a game scene according to an embodiment of the present disclosure. As shown in FIG. 2, in the present embodiment, the method includes the following steps.

At step S210, a parent model corresponding to the plurality of the static components is loaded, the parent model comprising at least two sub-models corresponding to the at least two sub-components, and information of each of the at least two sub-models is recorded in a model file of the parent model.

At step S220, a scene global identifier of at least one sub-model marked as hidden in the parent model is determined, the scene global identifier including identification information of the each of at least two sub-models in the game scene.

At step S230, at least two not marked as hidden of the parent model is rendered in a preset manner.

Corresponding to the processing method for static components in a game scene provided in the above embodiment, the method provided by the present embodiment is applied to a game running process. Since the information of the each of the sub-models is included in the parent model, the parent model can be locally hidden by using the information of each of the sub-models in a game running process. Thus, the disassembly rendering effect of a static component can be achieved. Since only one parent model needs to be rendered in the game running process by the static component, the pressure of memory and rendering brought by a large number of models is relieved effectively.

In an optional implementation, the information of each of the at least two sub-models includes a first local identifier, and the first local identifier includes identification information of each of the at least two sub-models within the range of the parent model.

The scene global identifier of the at least one sub-model marked as hidden in the parent model is determined includes the following steps.

A first global identifier of the parent model is acquired, the first global identifier including identification information of the parent model in the game scene.

The scene global identifier is determined according to the first global identifier of the parent model and the first local identifier of each of the at least two sub-models.

As mentioned above, the sub_destroy_id (i.e., the first local identifier) is generated when the at least two sub-models are combined, and is used for uniquely identifying each of the sub-models within the range of the parent model. When the game scene is edited, the parent model is used for scene placement. When the game scene is placed, a destroy_id (i.e., the first global identifier) is generated for the parent model. The destroy_id of the parent model and the sub_destroy_id of the sub-model may generate a full_destroy_id (i.e., the scene global identifier) for accurately positioning the at least two sub-models.

In an optional implementation, the method further includes the following steps.

When the parent model corresponding to the static component is loaded, at least one sub-collider corresponding to each of the sub-models constituting the parent model are added into a physical system of a game engine.

In response to a physical event for the plurality of the static components, the first global identifier of the parent model corresponding to the plurality of the static components for the physical event is acquired.

A target sub-collider hit by the physical event is detected through the game engine, and the first local identifier of a target sub-model corresponding to the target sub-collider is acquired.

The scene global identifier of the target sub-model is acquired according to the first global identifier of the parent model and the first local identifier of the target sub-model.

The target sub-model is positioned according to the scene global identifier of the target sub-model, and the target sub-model is marked as hidden.

In order to detect a target sub-collider hit by a physical event through the game engine when the virtual object performs a physical attack such as disassembly of the static component (i.e., a physical event for the static component), for example, the physical detection of the game engine may determine at least one sub-collider within an attack range, and then the sub-models corresponding to the disassembled sub-component are determined, thereby the effect of locally disassembling the static component by the virtual object is achieved. When the parent model corresponding to the plurality of static components is loaded, the at least one sub-collider corresponding to each of the sub-models constituting the parent model is added to a physical system of the game engine.

When the physical attack such as disassembly of the static component by the virtual object is detected, the at least one sub-collider within the attack range is detected by a physics engine such as SweepTest or RayTest in the game. A full_destroy_id (i.e., the scene global identifier) is acquired by, for example, the preset rule in the above implementation through the sub_destroy_id recorded on the at least one sub-collider and the destroy_id of the parent model. The target sub-model of the parent model may be matched by the full_destroy_id. The target sub-model is marked as hidden. In addition, in order to enable the at least one sub-collider to access the sub-model itself, when the sub-collider is added to the physical system of the game engine, a pointer to itself may be added to the at least one sub-collider.

In an optional implementation, the method further includes the following steps.

When a distance between the plurality of the static components to be rendered and a virtual camera of a game being greater than a preset value is detected, a low-precision grandparent model corresponding to a static component set in which the plurality of the static components are located, the static component set being a set of preset number of the static components, the low-precision grandparent model is acquired by combining low-precision sub-models, and the low-precision sub-models are models of low-precision version of the sub-model.

The scene global identifier of the at least one sub-model marked as hidden in the low-precision grandparent model is determined.

The at least one sub-model not marked as hidden of the low-precision grandparent model is rendered in a preset manner.

When the distance between the static component to be rendered and the virtual camera of the game is greater than a preset value is detected that, that is, when the static component to be rendered is located at a remote location is detected, an LOD mechanism is called to render using a low-precision model. The low-precision grandparent model is obtained by combining low-precision sub-models of multiple static components.

In an optional implementation, the method further includes the following steps.

When a distance between the plurality of the static components for the physical event and the virtual camera is greater than the preset value is detected, a second global identifier of the low-precision grandparent model corresponding to the static component set in which the plurality of the static components are located is acquired, the second global identifier including identification information of the low-precision grandparent model in the game scene.

The target sub-collider hit by the physical event is detected through the game engine, and a second local identifier of a low-precision target sub-model corresponding to the target sub-collider is acquired, the second local identifier including identification information of the low-precision target sub-model within the range of the low-precision grandparent model.

The scene global identifier of the target sub-model is acquired according to the second global identifier and the second local identifier of the low-precision target sub-model, and the target sub-model is marked as hidden.

When the plurality of the static components for the physical event is located at a distance and is subjected to a physical attack (i.e., a physical event) such as disassembly of the virtual object is detected, the target sub-collider hit by the physical event is detected by the game engine. For example, a target sub-collider within the attack range is detected by the physical engine in the game, the scene global identifier of the low-precision target sub-model is acquired by the second local identifier recorded on the target sub-collider and the grandparent model, and the target sub-model is marked as hidden.

In an optional implementation, the method further includes the following steps.

The scene global identifier of the at least one sub-model marked as hidden is synchronized to a server of the game, and broadcast to other clients of the game by the server, so that the other clients hide the at least one sub-model marked as hidden during the rendering of the game scene.

Through the above implementation, the scene global identifier of the each of sub-models corresponding to the sub-component of the removed static component may be synchronized to a server and broadcast to a game client corresponding to other game players (i.e., users). The game client corresponding to the other game players may delete the corresponding sub-model according to the scene global identifier.

In an optional implementation, the preset manner is a continuous rendering mechanism.

The rendering of the sub-models marked as hidden is skipped when the parent model of the static component is rendered. The continuous rendering mechanism is used for the non-disassembled part, which minimizes the consumption of rendering, thereby greatly alleviating the rendering pressure caused by a large number of models.

When rendering a model, a VB and an IB are first submitted, a shader is bound, shader parameters are set, a rendering state is set, and finally a drawing instruction is called. For example, if the static component corresponding to the parent model is not disassembled by the virtual object, the parent model is a complete whole. The above rendering process only needs to be performed once. When the static component corresponding to the parent model is partially disassembled, part of the parent model needs to be hidden. The whole parent model will be disassembled into multiple discontinuous parts. Correspondingly, the above rendering process needs to be performed multiple times, which causes the communication redundancy of a Central Processing Processor (CPU) and a Graphics Processing Unit (GPU) and increases the rendering pressure.

However, when the continuous rendering mechanism is used, for a partially hidden parent model (the corresponding static component is partially disassembled), in the above rendering process, the operations of submitting the VB and the IB, binding the shader, setting the shader parameters and setting the rendering state only need to be performed once. For disassembled discontinuous parts of the whole parent model, drawing instructions are called respectively, and a part of the IB is specified to be rendered, which greatly reduces the communication redundancy between the CPU and the GPU, and greatly improves the efficiency of rendering.

In an optional implementation, when the number of the low-precision grandparent model separated by the at least one sub-model marked as hidden exceeds the preset value, index rearrangement of the low-precision grandparent model is triggered, so that the low-precision grandparent model completes rendering in a render call.

When a portion of the remote LOD model is disassembled, it is often necessary to position the disassembled portion in a large LOD model for hidden displaying. Since the LOD model is relatively large, when a certain portion of the LOD model is disassembled, the LOD model is divided into many fragmented parts, resulting in a large increase in the number of rendered DPs (render calls). In order to limit the increase in the number of DPs, when the number of the low-precision grandparent model separated by the at least one sub-model marked as hidden exceeds the preset value, the index rearrangement of the low-precision grandparent model is triggered, so that the remaining objects can be completed by rendering of a DP. The correspondence between an initial state VB and IB is as shown by the dashed arrow in FIG. 5. When a rendering instruction is issued, every three index values in the IB are indexed to three vertices in the VB to form a triangle, which is rendered. The reason for indexing is that the vertices are common, and two adjacent triangles have two common vertices. In VB, the amount of data of two vertices can be saved, and vertex data is usually relatively large, for example, the vertex data generally includes position coordinates, normal, texture coordinates, tangent lines, etc. Indexing can greatly reduce the amount of data.

Figure 5:
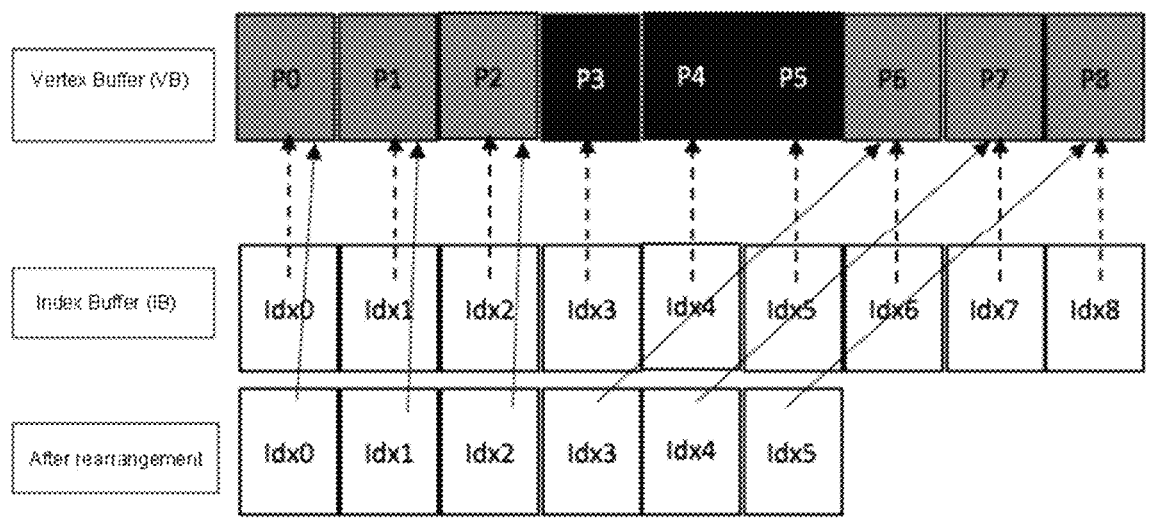
FIG. 5 is a schematic diagram of model index rearrangement in a model rendering process in one of exemplary embodiments of the present disclosure.

As shown in FIG. 5, it is assumed that the sub-models corresponding to indexes 3, 4, and 5 (i.e., P3, P4, and P5, respectively) do not need to be displayed (i.e., the corresponding sub-components are disassembled by the virtual object). Since one DP requires index data to be continuous, two DPs (Idx0-Idx1-Idx2, Idx6-Idx7-Idx8) are required. If a rearrangement threshold is 1, the index rearrangement is triggered as long as the parent model is divided into at least two consecutive regions by hidden portion, and IB rearrangement is triggered. After the rearrangement, the IB is continuous, so that drawing can be completed in one DP. The correspondence between the VB and the IB after rearrangement is as shown by the solid arrows in FIG. 5.

Apparently, as the rearrangement threshold is smaller, the rearrangement is more frequent. If the rearrangement is too large and does not reduce the DP, the rearrangement threshold needs to be determined according to specific situation of the game.

A processing device for static components in a game scene is also disclosed in the present exemplary embodiment. It should be noted that the processing device for static components in a game scene of this embodiment may be used for performing the processing method for static components in a game scene of the embodiment of the present disclosure. The processing device for static components in a game scene includes at least one processor, and at least one memory for storing at least one program element. The at least one program element is executed by the at least one processor. The at least one program element includes an acquisition component, a first processing component, a recording component, and a second processing component.

The acquisition component is configured to acquire sub-models corresponding to sub-components of the at least one static component.

The first processing component is configured to combine the sub-models to obtain a parent model corresponding to the at least one static component, and generate a first local identifier of each of the sub-models, the first local identifier including identification information of each of the sub-models within the range of the parent model.

The recording component is configured to record information of each of the sub-models in a model file of the parent model, the information of each of the sub-models comprising the first local identifier.

The second processing component is configured to edit the game scene using the parent model, and generate a first global identifier of the parent model, the first global identifier including identification information of the parent model in the game scene, the first global identifier and the first local identifier are used for acquiring a scene global identifier of each of the sub-models, and the scene global identifier including the identification information of each of the sub-models in the game scene.

It should be noted that the acquisition module, the first processing module, the recording module, and the second processing module may be run in a terminal as part of the device. The functions implemented by the above components may be executed by a processor in the terminal. The terminal may also be a smart phone (such as an Android phone or an iOS phone), a tablet computer, a palmtop, a Mobile Internet Device (MID), a PAD, or other terminal devices.

Specific details of various components in the above embodiment have been described in detail in the corresponding processing method for static components in a game scene. In addition, it can be understood that the processing device for static components in a game scene further includes other unit modules corresponding to those in the processing method for static components in a game scene. Therefore, detail descriptions are omitted herein.

A rendering device for static components in a game scene is also disclosed in the present exemplary embodiment. It should be noted that the rendering device for static components in a game scene of this embodiment may be used for performing the rendering method for static components in a game scene of the embodiment of the present disclosure.

Figure 6:
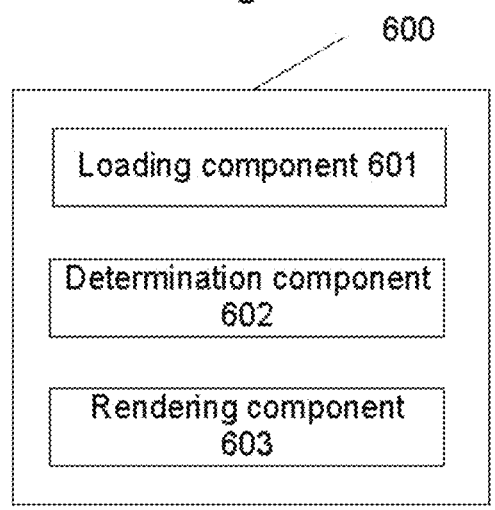
FIG. 6 is a composition diagram of a rendering device for static components in a game scene according to an embodiment of the present disclosure.

FIG. 6 is a composition diagram of a rendering device for static components in a game scene according to an embodiment of the present disclosure. The game scene includes a plurality of components, each of the static component is composed of at least two sub-components. The rendering device for static components in a game scene includes at least one processor, and at least one memory for storing at least one program element. The at least one program element is executed by the at least one processor. The at least one program element includes a loading component 601, a determination component 602 and a rendering component 603. As shown in FIG. 6, the device 600 includes the loading component 601, the determination component 602 and the rendering component 603.

The loading component 601 is configured to load a parent model corresponding to the plurality of the static components, the parent model comprising of at least two sub-models corresponding to the at least two sub-components, and information of each of the at least two sub-models is recorded in a model file of the parent model.

The determination component 602 is configured to determine a scene global identifier of at least one sub-model marked as hidden in the parent model, the scene global identifier including identification information of each of the at least two sub-models in the game scene.

The rendering component 603 is configured to render at least one sub-model not marked as hidden of the parent model in a preset manner.

It should be noted that the loading component 601, the determination component 602 and the rendering component 603 may be run in the terminal as part of the device, and the functions implemented by the above components may be executed by a processor in the terminal.

According to the above implementations, the parent model corresponding to the static component is loaded, information of each of the sub-models is recorded in a model file of the parent model, and according to a scene global identifier of each of the sub-models which is marked as hidden, at least one sub-model not marked as hidden of the parent model is rendered in a preset manner. Thus, the local hidden rendering effect of a static component can be achieved, and the pressure of memory and rendering brought by a large number of models can be relieved effectively.

Specific details of various components in the above embodiment have been described in detail in the corresponding rendering method for static components in a game scene. In addition, it can be understood that the rendering device for static components in a game scene further includes other unit modules corresponding to those in the rendering method for static components in a game scene. Therefore, detail descriptions are omitted herein.

It should be noted that although several components of the device for action execution are mentioned in the above detailed description, such division is not mandatory. In fact, according to the implementation manners of the disclosure, the features and functions of at least two components described above may be embodied in one component. Conversely, the features and functions of one module or unit described above may be further divided into multiple components and embodied.

Figure 7:
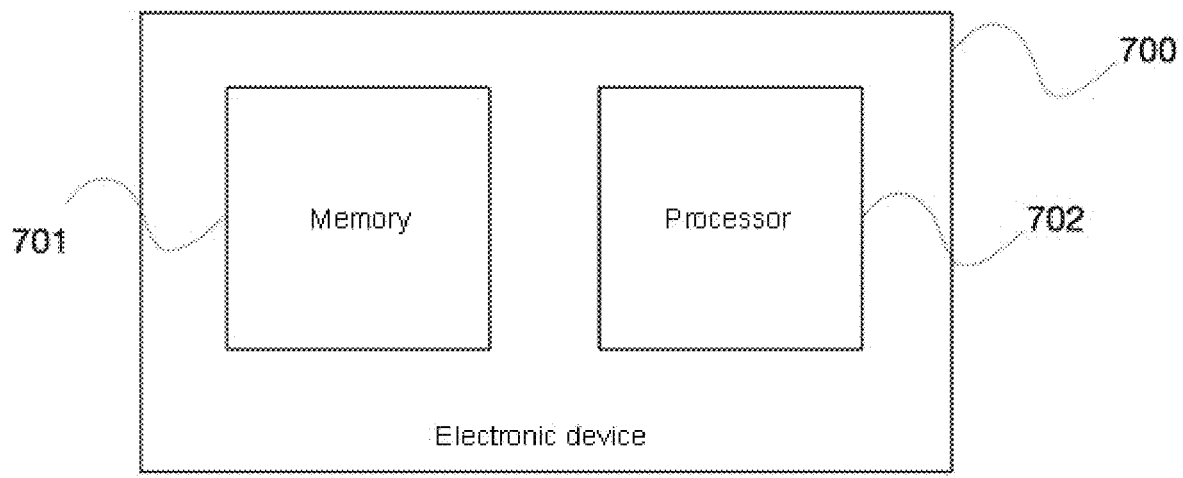
FIG. 7 is a structure schematic diagram of an electronic device according to an embodiment of the present disclosure.

FIG. 7 is a structure schematic diagram of an electronic device according to one embodiment of the disclosure. As shown in FIG. 7, the electronic device 700 of the present embodiment includes: a memory 701 and a processor 702. The memory 701 is connected with the processor 701, and configured to store at least one executable instruction of the processor. The at least one executable instruction may be a computer program. The processor 702 is arranged to execute the at least one executable instruction, and the at least one executable instruction includes the following steps.

The game scene comprising a plurality of static components, each of the static components comprising at least two sub-components, a parent model corresponding to the plurality of the static components is loaded, the parent model comprising at least two sub-models corresponding to the at least two sub-components, and information of each of the at least two sub-models is recorded in a model file of the parent model.

A scene global identifier of the at least one sub-model marked as hidden in the parent model is determined, the scene global identifier including identification information of each of the at least two sub-models in the game scene.

At least one sub-model not marked as hidden of the parent model is rendered in a preset manner.

Optionally, the information of each of the at least two sub-model includes a first local identifier, and the first local identifier includes identification information of each of the at least two sub-models within the range of the parent model.

The scene global identifier of the at least one sub-model marked as hidden in the parent model is determined includes the following steps.

A first global identifier of the parent model is acquired, the first global identifier including identification information of the parent model in the game scene.

The scene global identifier is determined according to the first global identifier of the parent model and the first local identifier of each of the at least two sub-models.

Optionally, the method further includes the following steps.

When loading the parent model corresponding to the plurality of the static components, at least one sub-collider corresponding to each of the at least two sub-models constituting the parent model are added into a physical system of a game engine.

In response to a physical event for the plurality of the static components, the first global identifier of the parent model corresponding to the static component for the physical event is acquired.

A target sub-collider hit by the physical event is detected through the game engine, and the first local identifier of a target sub-model corresponding to the target sub-collider is acquired.

The scene global identifier of the target sub-model is acquired according to the first global identifier of the parent model and the first local identifier of the target sub-model.

The target sub-model is positioned according to the scene global identifier of the target sub-model, and the target sub-model is marked as hidden.

Optionally, the method further includes the following steps.

When a distance between the plurality of the static components to be rendered and a virtual camera of a game is greater than a preset value is detected, a low-precision grandparent model corresponding to a static component set in which the plurality of the static components is located are loaded, the static component set being a set of preset number of the static components, the low-precision grandparent model is acquired by combining low-precision sub-models, and the low-precision sub-models are models of low-precision version of the at least two sub-models.

The scene global identifier of the at least one sub-model marked as hidden in the low-precision grandparent model is determined.

The at least one sub-model not marked as hidden of the low-precision grandparent model is rendered in a preset manner.

Optionally, When a distance between the plurality of the static components for the physical event and the virtual camera is greater than the preset value, a second global identifier of the low-precision grandparent model corresponding to the static component set in which the plurality of the static components are located is acquired, the second global identifier including identification information of the low-precision grandparent model in the game scene.

The target sub-collider hit by the physical event is detected through the game engine, and a second local identifier of a low-precision target sub-model corresponding to the target sub-collider is acquired, the second local identifier including identification information of the low-precision target sub-model within the range of the low-precision grandparent model.

A scene global identifier of the target sub-model is acquired according to the second global identifier and the second local identifier of the low-precision target sub-model, and the target sub-model is marked as hidden.

Optionally, the scene global identifier of the at least one sub-model marked as hidden is synchronized to a server of the game, and broadcast to other clients of the game by the server, so that the other clients hide the at least one sub-model marked as hidden during the rendering of the game scene.

Optionally, the preset manner is a continuous rendering mechanism.

Optionally, when the number of the low-precision grandparent model separated by the at least one sub-model marked as hidden exceeds the preset value, index rearrangement of the low-precision grandparent model is triggered, so that the low-precision grandparent model completes rendering in a render call.

Optionally, a specific example in the present embodiment may refer to the examples described in the above embodiments, and details are not described herein in the present embodiment.

According to the above implementations, the parent model corresponding to the static component is loaded, information of each of the sub-models is recorded in a model file of the parent model, and according to a scene global identifier of each of the sub-models which is marked as hidden, at least one sub-model not marked as hidden of the parent model is rendered in a preset manner. Thus, the local hidden rendering effect of a static component can be achieved, and the pressure of memory and rendering brought by a large number of models can be relieved effectively.

In an optional implementation manner, the electronic device may further include at least one processor, and a memory resource represented by at least one memory and configured to store at least one instruction executable by at least one processing component, such as an application program. The application program stored in the at least one memory may include at least one modules each corresponding to a set of instructions. In addition, the processing component is configured to execute instructions to perform the above-described information processing method.

The electronic device may also include a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

It can be understood by those of ordinary skill in the art that the structure shown in FIG. 7 is merely illustrative. The electronic device may be an electronic device such as a smart phone, a tablet computer, a palmtop computer, an MID, or a PAD. FIG. 7 does not limit the structure of the above electronic device. For example, the electronic device may also include more or fewer components (such as a network interface or a display device) than shown in FIG. 7, or has a different configuration from that shown in FIG. 7.

Figure 8:
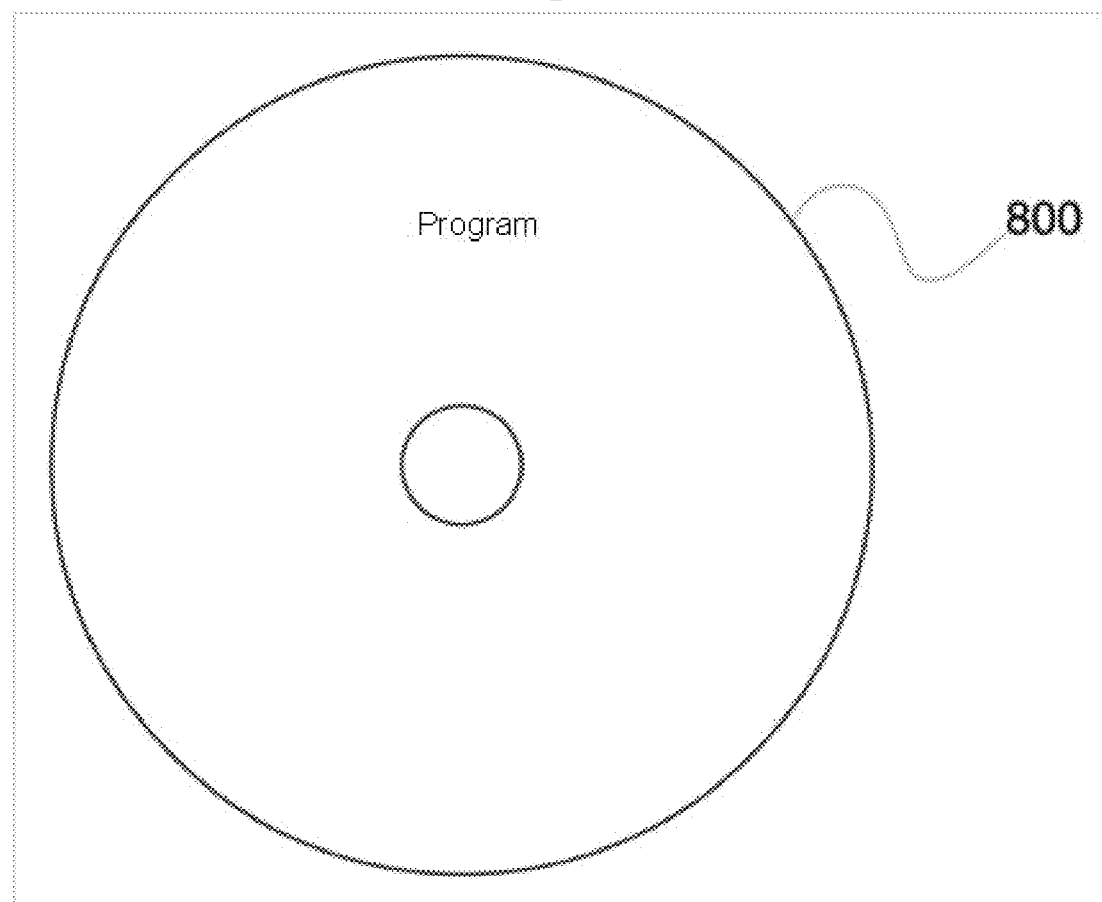
FIG. 8 is a structure schematic diagram of a storage medium according to an embodiment of the present disclosure.

FIG. 8 is a structure schematic diagram of a storage medium according to an embodiment of the present disclosure. As shown in FIG. 8, a program product 800 according to an implementation manner of the present disclosure is described. A computer program is stored thereon. When being executed by a processor, the computer program has a program code implementing the following steps.

A parent model corresponding to the plurality of the static components is loaded, the parent model comprising at least two sub-models corresponding to the at least two sub-components, and information of each of the at least two sub-models is recorded in a model file of the parent model.

A scene global identifier of the at least one sub-model marked as hidden in the parent model is determined, the scene global identifier including identification information of each of the at least two sub-models in the game scene.

At least one sub-model not marked as hidden of the parent model is rendered in a preset manner.

Optionally, the information of each of the at least two sub-model includes a first local identifier, and the first local identifier includes identification information of each of the at least two sub-models within the range of the parent model.

The scene global identifier of the at least one sub-model marked as hidden in the parent model is determined includes the following steps.

A first global identifier of the parent model is acquired, the first global identifier including identification information of the parent model in the game scene.

The scene global identifier is determined according to the first global identifier of the parent model and the first local identifier of each of the at least two sub-models.

Optionally, the method further includes the following steps.

When loading the parent model corresponding to the plurality of the static components, at least one sub-collider corresponding to each of the at least two sub-models constituting the parent model are added into a physical system of a game engine.

In response to a physical event for the plurality of the static components, the first global identifier of the parent model corresponding to the static component for the physical event is acquired.

A target sub-collider hit by the physical event is detected through the game engine, and the first local identifier of a target sub-model corresponding to the target sub-collider is acquired.

The scene global identifier of the target sub-model is acquired according to the first global identifier of the parent model and the first local identifier of the target sub-model.

The target sub-model is positioned according to the scene global identifier of the target sub-model, and the target sub-model is marked as hidden.

Optionally, the method further includes the following steps.

When a distance between the plurality of the static components to be rendered and a virtual camera of a game is greater than a preset value is detected, a low-precision grandparent model corresponding to a static component set in which the plurality of the static components is located are loaded, the static component set being a set of preset number of the static components, the low-precision grandparent model is acquired by combining low-precision sub-models, and the low-precision sub-models are models of low-precision version of the at least two sub-models.

The scene global identifier of the at least one marked as hidden in the low-precision grandparent model is determined.

The at least one sub-model not marked as hidden of the low-precision grandparent model is rendered in a preset manner.

Optionally, When a distance between the plurality of the static components for the physical event and the virtual camera is greater than the preset value, a second global identifier of the low-precision grandparent model corresponding to the static component set in which the plurality of the static components are located is acquired, the second global identifier including identification information of the low-precision grandparent model in the game scene.

The target sub-collider hit by the physical event is detected through the game engine, and a second local identifier of a low-precision target sub-model corresponding to the target sub-collider is acquired, the second local identifier including identification information of the low-precision target sub-model within the range of the low-precision grandparent model.

A scene global identifier of the target sub-model is acquired according to the second global identifier and the second local identifier of the low-precision target sub-model, and the target sub-model is marked as hidden.

Optionally, the scene global identifier of the at least one sub-model marked as hidden is synchronized to a server of the game, and broadcast to other clients of the game by the server, so that the other clients hide the at least one sub-model marked as hidden during the rendering of the game scene.

Optionally, the preset manner is a continuous rendering mechanism.

Optionally, when the number of the low-precision grandparent model separated by the at least one sub-model marked as hidden exceeds the preset value, index rearrangement of the low-precision grandparent model is triggered, so that the low-precision grandparent model completes rendering in a render call.

Optionally, a specific example in the present embodiment may refer to the examples described in the above embodiments, and details are not described herein in the present embodiment.

According to the above implementations, the parent model corresponding to the static component is loaded, information of each of the sub-models is recorded in a model file of the parent model, and according to a scene global identifier of each of the sub-models marked as hidden, at least one sub-model not marked as hidden of the parent model is rendered in a preset manner. Thus, the local hidden rendering effect of a static component can be achieved, and the pressure of memory and rendering brought by a large number of models can be relieved effectively.

The computer-readable storage medium may include a data signal that is propagated in a baseband or as part of a carrier, carrying readable program code. Such propagated data signals may take a variety of forms including, but not limited to, electromagnetic signals, optical signals, or any suitable combination of the foregoing. The computer-readable storage medium may send, propagate, or transmit a program for use by or in connection with an instruction execution system, apparatus, or device.

Program codes included in the computer-readable storage medium may be transmitted by any suitable medium, including but not limited to wireless, wire, optical cable, radio frequency, etc., or any suitable combination of the foregoing.

Through the description of the above implementation manner, those skilled in the art will readily understand that the example implementation manners described herein may be implemented by software or by software in combination with necessary hardware. Therefore, the technical solution according to the embodiment of the disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, server, electronic device, or network device, etc.) to perform a method in accordance with an embodiment of the disclosure.

Those of ordinary skill in the art can understand that all or part of the steps in various methods of the above embodiments may be completed by a program to indicate the related hardware of the processing device and rendering device for static components in a game scene. The program may be stored in a readable storage medium. The storage medium may include a flash disk, a Read-Only Memory (ROM), a Random Access Memory (RAM), a magnetic disk or an optical disk, and the like.

The processing method, rendering method and device for static components in a game scene according to the present disclosure are described by way of example with reference to the accompanying drawings. However, those skilled in the art should understand that various improvements can be made to the processing method, rendering method and device for static components in a game scene proposed in the present disclosure, without departing from the content of the present disclosure. Therefore, the scope of protection of the present disclosure should be determined by the content of the appended claims.

Other embodiments of the disclosure will be apparent to those skilled in the art after considering the specification and practicing the disclosure herein. The present application is intended to cover any variations, uses, or adaptations of the disclosure, which are in accordance with the general principles of the disclosure and include common general knowledge or conventional technical means in the art that are not disclosed in the disclosure. The specification and examples are to be regarded as illustrative only, and the true scope and spirit of the disclosure are pointed out by the claims.

It is to be understood that the disclosure is not limited to the accurate structure that have been described and shown in the drawings, and may make various modifications and variations without departing the scope thereof. The scope of the disclosure is limited only by the appended claims.

INDUSTRIAL APPLICABILITY

In the embodiment of the present disclosure, a parent model corresponding to a plurality of static component is loaded, information of each of at least two sub-models being recorded in a model file of the parent model, and according to a scene global identifier of each of the sub-models marked as hidden, at least one sub-model not marked as hidden of the parent model is rendered in a preset manner. Thus, the local hidden rendering effect of a static component can be achieved, and the pressure of memory and rendering pressure brought by a large number of models can be relieved effectively.

What is claimed is:
1. A processing method for static components in a game scene, comprising:
    acquiring sub-models corresponding to sub-components of at least one static component;
    combining the sub-models to obtain a parent model corresponding to the at least one static component, and generating a first local identifier of each of the sub- models, the first local identifier comprising identification information of each of the sub-models within a range of the parent model;

recording information of each of the sub-models in a model file of the parent model, the information of each of the sub-models comprising the first local identifier; and editing the game scene by using the parent model, and generating a first global identifier of the parent model, the first global identifier comprising identification information of the parent model in the game scene, the first global identifier and the first local identifier being used for acquiring a scene global identifier of each of the sub-models, and the scene global identifier comprising the identification information of each of the sub-models in the game scene.

2. The method as claimed in claim 1, further comprising:
establishing an association relationship of at least one sub-collider corresponding to each of the sub-models; and recording the first local identifier of each of the sub-models corresponding to the at least one sub-collider.

3. The method according as claimed in claim 1, further comprising:
acquiring low-precision sub-models corresponding to sub-components of preset number of static components, the low-precision sub-models being models of low-precision version of the sub-models;

combining the low-precision sub-models corresponding to the sub-components of the preset number of the static components to acquire a grandparent model corresponding to a static component set composed of the preset number of the static components, and generating a second local identifier of each of the low-precision sub-models, the second local identifier comprising identification information of the low-precision sub-models within the range of the grandparent model;

recording information of the low-precision sub-models in a model file of the grandparent model, the information of the low-precision sub-models comprising the second local identifier; and generating a second global identifier of the grandparent model, the second global identifier comprising identification information of the grandparent model in the game scene, the second global identifier and the second local identifier being used for acquiring the scene global identifier of the low-precision sub-models in the game scene.

4. The method according as claimed in claim 3, further comprising:
establishing an association relationship of at least one sub-collider corresponding to each of the low-precision sub-models; and recording the second local identifier of each of the low-precision sub-models corresponding to the at least one sub-collider.

5. The method according as claimed in claim 4, further comprising at least one of the following steps:
acquiring the at least one sub-collider corresponding to each of the low-precision sub-models having a volume smaller than a preset volume; and acquiring the at least one sub-collider corresponding to each of the low-precision sub-model having a height lower than a preset height.

6. A rendering method for static components in a game scene, the game scene comprising a plurality of static components, each of the static components comprising at least two sub-components, the method comprising:
loading a parent model corresponding to the plurality of the static components, the parent model comprising at least two sub-models corresponding to the at least two sub-components, and information of each of the at least two sub-models being recorded in a model file of the parent model;

determining a scene global identifier of at least one sub-model marked as hidden in the parent model, the scene global identifier comprising identification information of each of the at least two sub-models in the game scene; and rendering at least one sub-model not marked as hidden of the parent model in a preset manner.

7. The method as claimed in claim 6, wherein the information of each of the at least two sub-models comprises a first local identifier, the first local identifier comprising identification information of each of the at least two sub-models within the range of the parent model; and determining the scene global identifier of the at least one sub-model marked as hidden in the parent model comprises:
acquiring a first global identifier of the parent model, the first global identifier comprising identification information of the parent model in the game scene; and determining the scene global identifier according to the first global identifier of the parent model and the first local identifier of each of the at least two sub-models.

8. The method as claimed in claim 7, further comprising:
when loading the parent model corresponding to the plurality of the static components, adding at least one sub-collider corresponding to each of the at least two sub-models constituting the parent model into a physical system of a game engine;

in response to a physical event for the plurality of the static components, acquiring the first global identifier of the parent model corresponding to the plurality of the static components for the physical event;

detecting a target sub-collider hit by the physical event through the game engine, and acquiring the first local identifier of a target sub-model corresponding to the target sub-collider;

acquiring the scene global identifier of the target sub-model according to the first global identifier of the parent model and the first local identifier of the target sub-model; and positioning the target sub-model according to the scene global identifier of the target sub-model, and marking the target sub-model as hidden.

9. The method as claimed in claim 8, further comprising:
when detecting that a distance between the plurality of the static components to be rendered and a virtual camera of a game is greater than a preset value, loading a low-precision grandparent model corresponding to a static component set in which the plurality of the static components are located, the static component set being a set of preset number of the static components, the low-precision grandparent model being acquired by combining low-precision sub-models, and the low-precision sub-models being models of low-precision version of the at least two sub-models;

determining the scene global identifier of the at least one sub-model marked as hidden in the low-precision grandparent model; and rendering the at least one sub-model not marked as hidden of the low-precision grandparent model in a preset manner.

10. The method as claimed in claim 9, further comprising:
when detecting that a distance between the plurality of the static components for the physical event and the virtual camera is greater than the preset value, acquiring a second global identifier of the low-precision grandparent model corresponding to the static component set in which the plurality of the static components are located, the second global identifier comprising identification information of the low-precision grandparent model in the game scene;
detecting the target sub-collider hit by the physical event through the game engine, and acquiring a second local identifier of a low-precision target sub-model corresponding to the target sub-collider, the second local identifier comprising identification information of the low-precision target sub-model within the range of the low-precision grandparent model; and
acquiring the scene global identifier of the target sub-model according to the second global identifier and the second local identifier of the low-precision target sub-model, and marking the target sub-model as hidden.

11. The method according to claim 10, wherein when a number of the low-precision grandparent model separated by the at least one sub-model marked as hidden exceeds the preset value, triggering index rearrangement of the low-precision grandparent model, so as to be that the low-precision grandparent model completes rendering in a render call.

12. The method according to claim 9, wherein when a number of the low-precision grandparent model separated by the at least one sub-model marked as hidden exceeds the preset value, triggering index rearrangement of the low-precision grandparent model, so as to be that the low-precision grandparent model completes rendering in a render call.

13. The method according to claim 8, further comprising:
when loading the parent model corresponding to the plurality of the static components, adding the at least one sub-collider corresponding to each of the sub-models constituting the parent model to a physical system of the game engine, and adding a pointer to the at least one sub-collider, the pointer being used for making the at least one sub-collider access the sub-models.

14. A processing device for static components in a game scene, comprising at least one processor, and at least one memory for storing at least one program element, wherein the program element is executed by the at least one processor, the at least one program element comprising:
an acquisition component, configured to acquire sub-models corresponding to sub-components of the at least one static component;
a first processing component, configured to combine the sub-models to obtain a parent model corresponding to the at least one static component, and generate a first local identifier of each of the sub-models, the first local identifier comprising identification information of each of the sub-models within a range of the parent model;
a recording component, configured to record information of each of the sub-models in a model file of the parent model, the information of each of the sub-models comprising the first local identifier; and
a second processing component, configured to edit the game scene by using the parent model, and generate a first global identifier of the parent model, the first global identifier comprising identification information of the parent model in the game scene, the first global identifier and the first local identifier being used for acquiring a scene global identifier of each of the sub-models, and the scene global identifier comprising the identification information of each of the sub-models in the game scene.

15. The method according to claim 7, further comprising:
when placing the game scene by using the parent model, generating the first global identifier for the parent model.

16. The method as claimed in claim 6, further comprising:
synchronizing the scene global identifier of the at least one sub-model marked as hidden to a server of the game, and broadcasting to other clients of the game by the server, so as to be that the other clients hide the at least one sub-model marked as hidden during the rendering of the game scene.

17. The method according to claim 6, wherein the preset manner is a continuous rendering mechanism.

18. A rendering device for static components in a game scene, the game scene comprising a plurality of static components, each of the static components comprising at least two sub-components, the device comprising at least one processor, and at least one memory for storing at least one program element, wherein the program element is executed by the at least one processor, the at least one program element comprising:
a loading component, configured to load a parent model corresponding to the plurality of the static components, the parent model comprising at least two sub-models corresponding to the at least two sub-components, and information of each of the at least two sub-models is recorded in a model file of the parent model;
a determination component, configured to determine a scene global identifier of at least one sub-model marked as hidden in the parent model, the scene global identifier comprising identification information of each of the at least two sub-models in the game scene; and
a rendering component, configured to render at least one sub-model not marked as hidden of the parent model in a preset manner.

19. An electronic device, comprising:
a processor; and
a memory, connected with the processor and configured to store at least one executable instruction of the processor,
wherein the processor is arranged to execute the at least one executable instruction, and the at least one executable instruction comprises:
the game scene comprising a plurality of static components, each of the static components comprising at least two sub-components, loading a parent model corresponding to the plurality of the static components, the parent model comprising of at least two sub-models corresponding to at least two sub-components, and information of each of the at least two sub-models being recorded in a model file of the parent model;
determining a scene global identifier of at least one sub-model marked as hidden in the parent model, the scene global identifier comprising identification information of each of the at least two sub-models in the game scene; and
rendering at least one sub-model not marked as hidden of the parent model in a preset manner.

20. A computer-readable storage medium, on which at least one computer program is stored, wherein the at least one computer program is executed by at least one processor to perform the following steps:

acquiring sub-models corresponding to sub-components of at least one static component;

combining the sub-models to obtain a parent model corresponding to the at least one static component, and generating a first local identifier of each of the sub-models, the first local identifier comprising identification information of each of the sub-models within a range of the parent model;

recording information of each of the sub-models in a model file of the parent model, the information of each of the sub-models comprising the first local identifier; and editing the game scene by using the parent model, and generating a first global identifier of the parent model, the first global identifier comprising identification information of the parent model in the game scene, the first global identifier and the first local identifier being used for acquiring a scene global identifier of each of the sub-models, and the scene global identifier comprising the identification information of each of the sub-models in the game scene.

\* \* \* \* \*